United States Patent
Scherer et al.

[11] Patent Number: 5,890,957
[45] Date of Patent: Apr. 6, 1999

[54] AIR-CONDITIONING SYSTEM FOR HIGH CAPACITY AIRCRAFT

[75] Inventors: Thomas Scherer, Hamburg; Uwe Buchholtz, Bliedersdorf, both of Germany

[73] Assignee: Daimler-Benz Aerospace Airbus GmbH, Hamburg, Germany

[21] Appl. No.: 950,533

[22] Filed: Oct. 14, 1997

[30] Foreign Application Priority Data

Oct. 12, 1996 [DE] Germany .......................... 19642203.5

[51] Int. Cl.⁶ .................................................. B64D 13/06
[52] U.S. Cl. ............................................. 454/76; 454/99
[58] Field of Search .................. 454/76, 87, 99; 244/118.5

[56] References Cited

U.S. PATENT DOCUMENTS

| | | | |
|---|---|---|---|
| 4,742,760 | 5/1988 | Horstman et al. | 454/76 |
| 5,479,983 | 1/1996 | Fischer et al. | |
| 5,516,330 | 5/1996 | Dechow et al. | |
| 5,545,084 | 8/1996 | Fischer et al. | 454/76 |
| 5,695,396 | 12/1997 | Markwart et al. | 454/76 |

FOREIGN PATENT DOCUMENTS 382-604 8/1990 European Pat. Off. ................. 454/76

*Primary Examiner*—Harold Joyce
*Attorney, Agent, or Firm*—W. F. Fasse; W. G. Fasse

[57] ABSTRACT

A ventilation and air-conditioning system for a high capacity passenger aircraft having plural passenger decks one above another interconnected by stairways or the like, includes two air recycling units (6, 7) respectively incorporating filter units (61, 71) and blower units (62, 72). The inlets of the air recycling units are respectively connected to used air outlets (60, 70) arranged in an upper cabin (2), while the outlets of the recycling units are respectively connected to two air mixing junctions (9 and 10). The first air mixing junction (9) mixes a recirculation airstream from the first recycling unit (6) with an air-conditioned fresh airstream to provide a first mixed airstream into the upper cabin (2) through an air inlet (93). The second air mixing junction (10) mixes a deck transfer recirculation airstream provided by the second recycling unit (7) with an air-conditioned fresh airstream and directs the resulting second mixed airstream into the main cabin (3) through an air supply inlet (103). Used air is exhausted from the main cabin (3) through exhaust air channels (81, 82) into an exhaust air space (8), from which the air is exhausted overboard from the aircraft.

22 Claims, 2 Drawing Sheets

AIR-CONDITIONING SYSTEM FOR HIGH CAPACITY AIRCRAFT

FIELD OF THE INVENTION

The invention relates to an air-conditioning system for ventilating and air-conditioning a high capacity aircraft including at least an upper deck and a main deck that are to be occupied by passengers, and a lower deck for accommodating freight or baggage for example. At least the upper deck and the main deck are to be ventilated and air-conditioned while providing a mixture of fresh air and recycled air to each deck.

BACKGROUND INFORMATION

A known manner of air-conditioning passenger cabins of present passenger aircraft involves blowing temperature-regulated mixed air, comprising fresh air mixed with recirculated air, into the upper ceiling region of the passenger cabin space. The mixed air then flows through the cabin space, and a first portion of the resulting used air is removed from the cabin through exhaust vents or outlets arranged near or directly in the cabin floor and also below the cabin floor. This portion of the used cabin air is then directed to the one or more outlet or exhaust valves arranged distributed over the length of the aircraft fuselage, through which the exhaust air is exhausted overboard in a pressure regulated manner into the external environment outside of the aircraft. Moreover, a further portion of the used cabin air is constantly extracted from the upper cabin region and is then mixed with fresh air provided by the air-conditioning cooling packs to prepare recirculation mixed air, which is then blown back into the passenger cabin through ceiling inlets. It is also known that at least a portion of the used cabin air, after it has been removed from the passenger cabin through the used air or exhaust outlets, can be sucked in by a blower or fan and thereafter mixed with the above-mentioned fresh air to prepare recirculation air that is directed back into the aircraft cabin in a closed cycle.

The above described known systems relate to the air distribution and air-conditioning within a single-storied passenger deck, namely a single passenger deck on a single level, within an aircraft. The air distribution and air-conditioning requirements in such a case are quite different from those required in a multi-deck aircraft with compensated pressure conditions between a plurality of passenger decks that are connected with one another through stairwells or stairways. In the known air-conditioning systems used in aircraft having a single-storied or single-level passenger deck, the flow of the used passenger air through the cabin space and especially through the exhaust openings or outlets, causes an air flow resistance that leads to a pressure increase in the cabin space. The cabin forms a pressurized chamber that has air inlets as well as exhaust openings distributed uniformly along the direction of the lengthwise axis of the aircraft fuselage. As a result, the mixed air quantity, namely the prepared recirculation air mixed with fresh air, that is blown into a particular cabin cross-section always flows through the same cabin cross-section, so that a lengthwise air flow along the cabin and a consequent air exchange with the neighboring cabin cross-sections are avoided.

Aircraft having a multi-deck configuration in which plural aircraft cabins are arranged one above another and interconnected by large stairwells or stairways are also known. The air flow conditions through the upper passenger cabin of a multi-deck passenger aircraft would be disadvantageously altered if one would attempt to air-condition this upper cabin according to the known state of the art relating to single-level cabin aircraft. Since the air flow resistance through the stairways interconnecting the individual decks, e.g. the upper deck cabin and the main deck cabin, is only a fraction of the air flow resistance through the exhaust air openings, there would be a tendency for the recycled mixed air blown into the upper deck cabin to exit or escape for the most part through the one or more stairways connecting the upper deck cabin to the main deck cabin. As a result of this, substantial lengthwise air flows would be established in one or both of the cabins, which would in turn disadvantageously cause temperature stratification and passenger comfort problems. These problems would be further amplified if the quantity of fresh air being provided or mixed into the air flow delivered into the cabins would be set in a variable manner.

German Patent 4,425,871 and corresponding U.S. Pat. No. 5,545,084 (Fischer et al.) describe one possible solution to the above mentioned problems. The entire disclosure of U.S. Pat. No. 5,545,084 is incorporated herein by reference. U.S. Pat. No. 5,545,084 describes a method and an apparatus for air-conditioning a multi-deck high capacity passenger aircraft having a main deck and an upper deck arranged above the main deck. An exhaust air stream extracted from the main deck is directed through a recycling package where it is filtered and the like, and is then directed to a premixing unit where it is pre-mixed with prepared pressurized engine bleed air. Thereafter, the premixed airstream is directed to at least one local mixing chamber, where it is further mixed with exhaust air that has been extracted from the upper deck and passed through a recycling pack. The final mixed air flow prepared by this mixing unit is partially directed into the upper deck passenger cabin and partially directed into the main deck passenger cabin.

While the solution disclosed in U.S. Pat. No. 5,545,084 is effective for achieving its intended objects and overcoming or avoiding many problems of the prior art, it has been determined that further improvements are still possible. For example, under at least some operating conditions in the air-conditioning system of U.S. Pat. No. 5,545,084, the quantity of air sucked out of the upper deck will not correspond to the quantity of air directed back into the upper deck. Such a condition would necessarily result in an over-pressure or under-pressure condition in the upper deck, which would in turn result in an undesirable air flow and exchange between the upper deck and the lower deck through any stairway that may be interconnecting these decks. Furthermore, since the previously patented system involves pre-mixing used air from the main deck with fresh air in a pre-mixing chamber to prepare pre-mixed air, and then further mixing the pre-mixed air with used air from the upper deck in at least one local mixing chamber, the respective local mixing chamber must have outlets with rather large cross-sectional areas to handle the resulting total air flow quantities, and the overall system requires a comparatively large number of ducts and air handling devices. Such a structure requires a greater amount of installation space and also disadvantageously increases the total weight and the fuel consumption of the multi-deck passenger aircraft, in comparison with the further improved system that is the subject matter of the present application.

SUMMARY OF THE INVENTION

In view of the above, it is an object of the invention to provide a ventilation, air distribution, and air-conditioning system of the above mentioned general type for a high capacity passenger aircraft having plural passenger decks arranged one above another and interconnected by respective stairwells or stairways. The present system is to be arranged and embodied in such a manner that it can achieve a balanced or compensated pressure relationship between the passenger decks, so that an air flow and air exchange between the decks through the stairwell or stairway interconnections is prevented. Further objects of the invention are to achieve a uniform air flow through all cabin cross-sections over the length of the cabin without causing lengthwise air flows flowing along the fuselage lengthwise axis and thus crossing over or among plural cross-sectional zones or areas. Moreover, temperature stratification problems, which cause an undesirable influence on passenger comfort, are to be avoided and prevented by the system according to the invention. Furthermore, the construction, operation and control of the present system is to be simplified and improved. By avoiding the need of using air channels or ducts having disadvantageously large cross-sections to provide the necessary air flow connections, the total weight and fuel consumption of the high capacity passenger aircraft is to be reduced. Further in view of simplification, the present system aims to reduce the total number and complexity of ducts, mixing devices, and air handling devices, and aims to achieve one-stage mixing of recirculation air and fresh air without sequential pre-mixing and local mixing.

The above objects have been achieved in an air-conditioning system, according to the invention, for a high capacity passenger aircraft having at least a lower deck, a main deck cabin, and an upper deck cabin arranged one above another and with at least one opening, channel, or passage forming a pressure chamber interconnection that interconnects the upper deck cabin and the main deck cabin with each other. The aircraft further includes an exhaust air space or chamber below the lower deck, and at least one exhaust air channel connecting the main deck cabin to the exhaust air space. The upper deck cabin and the main deck cabin are passenger cabins that are to be air-conditioned, while the lower deck may be a freight deck, for example, that does not need to be air-conditioned.

In order to provide air-conditioning in the two passenger cabins with the advantages as described above, the present system includes at least one recycling unit including a blower or fan device, and the upper deck cabin is connected to the recycling unit for a used air stream to flow from the upper cabin into and through the recycling unit to provide a recirculation air stream. A respective recirculation duct connects a respective outlet of the at least one recycling unit to a first mixing junction or intersection and to a second mixing junction or intersection, where the recirculation air stream is respectively mixed with a pressurized, cooled, air-conditioned air stream provided by one or more air-conditioning packs. Thus, the first mixing junction provides at its outlet a first mixed air stream that is directed through a corresponding duct into air supply inlets in the upper deck cabin. Similarly, the second mixing junction provides at its outlet a second mixed airstream that is delivered through a corresponding duct to air supply inlets in the main deck cabin. Exhaust air leaves the main deck cabin through the exhaust air channels leading to the exhaust air space below the lower deck, and from there the exhaust air is vented overboard through one or more appropriate pressure regulating exhaust valves.

In a preferred embodiment, two recycling units are provided, to independently prepare a first recirculation air stream that is directed to the first mixing junction on the one hand, and a second recirculation air stream that is directed to the second mixing junction on the other hand. Thus, in such an embodiment, a first recycling unit provides recirculation air to be recirculated back into the upper deck cabin, and a second recycling unit provides recirculation air to be recirculated into the main deck cabin. In a variant embodiment, a single recycling unit receives exhaust air from the upper deck cabin, and provides a recycled or recirculation airstream that is then split or branched to both the first mixing junction and the second mixing junction in a proportionate manner as required.

With the above described arrangement, the present invention achieves balanced or compensated ventilation and air-conditioning for the upper deck cabin and the main deck cabin while avoiding pressure imbalances and resulting air flows through the passage or channel between the two decks, which may be a passenger stairway or the like. To achieve this, the blower or fan of the recycling unit that provides the recirculation air stream that is to be mixed with fresh air and introduced into the main deck cabin is speed controllable so that it sucks the proper amount of exhaust air from the upper deck cabin as is required at any time to achieve a balanced or compensated volume flow of the total air volume flowing into the upper deck relative to the total air volume being sucked out of the upper deck. More specifically, the air flow rate of used air being sucked out of the upper deck cabin to be recirculated to the main deck cabin is equal to the air flow rate of fresh air being introduced into the upper deck cabin, as nearly as possible considering ordinary air handling precision and tolerances. As such, the air volume flowing into the upper deck cabin through the air supply inlets is substantially exactly matched by the air volume being sucked out of the upper deck cabin through the one or more used air outlets, and no used air is sucked out of the main deck cabin as recirculation air but rather all of the used air exhausted from the main deck cabin is vented overboard. As a result, a pressure difference and a resulting air flow between the upper deck cabin and the main deck cabin is avoided. Also, the system is considerably simplified.

BRIEF DESCRIPTION OF THE DRAWINGS

In order that the invention may be clearly understood, it will now be described, in connection with example embodiments and with reference to the drawings, wherein.

DETAILED DESCRIPTION OF PREFERRED EXAMPLE EMBODIMENTS AND OF THE BEST MODE OF THE INVENTION

Figure 1:
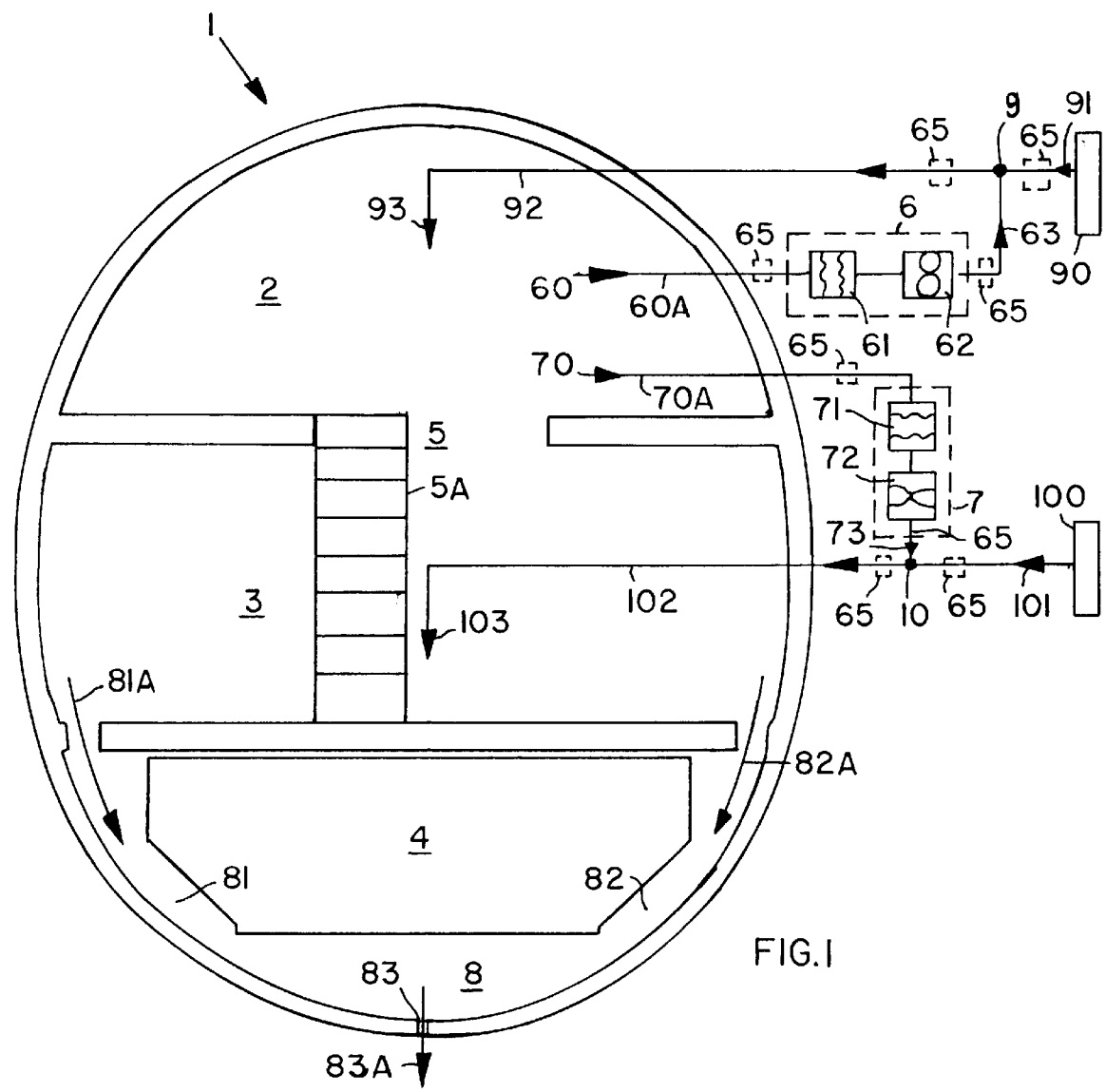
FIG. 1 is a schematic cross-section through an aircraft fuselage equipped with a ventilation and air-conditioning system according to the invention, in a first a embodiment.

FIG. 1 schematically shows a general overview of the ventilation and air-conditioning system according to the invention, for a high capacity passenger aircraft in which the space within the pressurized fuselage 1 is divided into several decks arranged one above another. Namely, the fuselage 1 encloses an upper deck space 2 and a main deck space 3 respectively outfitted as passenger cabins, a lower deck space 4 outfitted as a freight, cargo, and/or baggage hold in this example, and an exhaust air space 8 arranged below the lower deck space 4. The upper deck space 2, main deck space 3, and exhaust air space 8 together functionally form or represent a pressurized cabin within the aircraft fuselage 1. A channel- or passage-like pressure chamber interconnection 5 is represented as an opening in the deck floor between the upper deck space 2 and the main deck space 3, and interconnects these two spaces 2 and 3 with each other. This channel-like or passage-like interconnection 5 may, for example, be a stairwell or stairway 5A that can be used by the passengers for moving between the two passenger decks. However, since the interconnection 5 represents an opening between the two spaces 2 and 3, there is a possibility of air flow, air exchange, and drafts between the two spaces 2 and 3, unless special provisions are made to achieve a balance of the pressure and air flow conditions in the two spaces 2 and 3, as is achieved by the arrangement of the invention.

Both passenger cabin spaces 2 and 3 are to be air-conditioned and properly ventilated. In order to improve the overall economy of the ventilation and air-conditioning system, at least a portion of the cabin air is recycled, which is achieved with two recycling units 6 and 7. Each recycling unit 6 and 7 respectively comprises a filtering unit 61 and 71 and a blower or fan unit 62 and 72 arranged in series after or downstream of the respective filter unit 61 and 71, namely the filter unit 61 and 71 is arranged at the inlet of the respective recycling unit 6 and 7 while the blower or fan unit 62 and 72 is arranged at the outlet of the respective recycling unit 6 and 7. Each filter unit 61 and 71 respectively comprises a plurality of series-arranged, specific purpose filters, for removing particles, odors, bacteria and any other contaminants such as toxic substances or gases such as carbon dioxide, from the used air that is to be recirculated. Each blower unit 62 and 72 respectively sucks the used cabin air out of the upper deck space 2 and through the respective filter unit 61 and 71. To achieve this, each blower unit 62 and 72 respectively comprises at least one ventilator such as a blower or fan that has a controllable rotational speed and thus a controllable air flow rate. In turn, due to the characteristic rotational speed regulation or control of the blower units 62 and 72, the flow rate of the removed used air stream and correspondingly the flow rate of the recirculated air stream delivered back into the cabin may be regulated or controlled in a precise manner, as will be described further below.

To carry out the recycling, ventilation and air-conditioning, the two recycling units 6 and 7 are connected in air flow circuits as follows. Both of the recycling units 6 and 7 are connected at their inlet ends to respective exhaust air outlets 60 and 70 in the upper deck space 2, so that each recycling unit 6 and 7 sucks a partial quantity, i.e. a portion of the total quantity, of used cabin air out of the upper deck space 2 as recirculation air. More specifically, the first recycling unit 6 is connected via a duct or air channel 60A to a ceiling level used air outlet 60, which may, for example, be arranged in the side wall paneling near the ceiling paneling of the upper cabin 2, above a hatrack box or overhead baggage compartment. The second recycling unit 7 is connected via a duct or air channel 70A to a floor level used air outlet 70 that may, for example, be arranged near the floor in the side wall paneling of the upper cabin space 2.

Furthermore, the outlet of the first recycling unit 6 is connected via a recirculation air duct 63 to a first functional intersection or mixing junction 9, while the outlet of the second recycling unit 7 is connected via a deck transfer air duct 73 to a second functional intersection or mixing junction 10. Each mixing junction 9 and 10 includes a respective mixing unit that may comprise a mixing valve, a proportional metering valve, or a simple duct junction optionally with dampers that may be controllable as needed, air flow sensors, pressure regulators, and any other known device for metering and mixing air flows. Each mixing junction 9 and 10 respectively has two inlets and one outlet, whereby one respective inlet is respectively connected to the outlets of the recycling units 6 and 7 as described above, the other respective inlets are respectively connected to a supply of air-conditioned air, and the outlets are respectively connected to the cabins, as will now be described. The sources of pressurized air-conditioned fresh air may comprise one or more pre-conditioning units 90 and 100, either consisting of sole air conditioning packs or a combination of air-conditioning packs, mixing junctions, blower fans and filters, that are connected to the respective inlets of the two mixing junctions 9 and 10 via corresponding supply air ducts 91 and 101. The supply air provided through the ducts 91 and 101 could consist either of exterior air that has been pressurized and appropriately temperature-adjusted in a known manner, for example engine bleed air that has been air-conditioned by air-conditioning packs as needed or of mixed air, composed of exterior and cabin air. It should further generally be understood throughout this specification, that the air supply to the mixing junctions 9 and 10 could comprise pure fresh air only or pre-conditioned air, consisting of fresh air and recirculated air from the cabin. Thus the term "fresh air" is used generally in this specification to refer to any such type of air flow as appropriate for the particular situation. The recirculation air that has been processed and recycled through the recycling units 6 and 7 and that is provided through the recirculation air ducts 63 and 73 is then mixed in the required or desired proportions with the fresh air respectively in the mixing junctions 9 and 10.

The outlet side of the mixing junction 9 is connected to the upper deck space 2 via a duct 92 through one or more ceiling air inlets 93 in the upper deck space 2, for example, mounted approximately in the middle of the ceiling paneling of the upper deck space 2. The outlet side of the second mixing junction 10 is connected to the main deck space 3 via a duct 102 through one or more ceiling air inlets 103 provided in the main deck space 3, for example arranged in the side wall paneling above a hatrack box or overhead baggage compartment and near the ceiling paneling of the main deck space 3. In this manner, the respective mixed air streams, i.e. the mixtures of recirculated air and air-conditioned fresh air, provided by the mixing junctions 9 and 10 are separately provided through separate ducts into the upper deck space 2 and the lower deck space 3, which together form the overall air-conditioned space. It should further be understood that a respective plurality of the air inlets 93 and the air inlets 103 are preferably provided spaced along the lengthwise direction of the respective cabins. These plural air inlets 93 and 103 may respectively be connected to one or a plurality of the mixing junctions 9 and 10.

Two exhaust air channels 81 and 82 connect the main deck space 3 to the exhaust air space 8 along the sides of the lower deck space 4, i.e. between the walls of the cargo hold and the fuselage 1 on both sides, so that exhaust air streams 81A and 82A can flow from the main deck space 3 into the exhaust air space 8. In this manner, while all the used air from the upper deck space 2 is sucked out through the air outlets 60 and 70 to the recycling units 6 and 7, the used air from the lower deck space 3 is all directed as exhaust air 81A and 82A into the exhaust air space 8, from which the exhaust air is vented overboard, i.e. exhausted outside the aircraft, as an exhaust air stream 83A through at least one exhaust air outlet valve or dumping valve 83 installed in the floor or belly area of the fuselage 1. The one or more valves 83 may be pressure regulated valves, or any other exhaust air release valve known in the art. It should further generally be understood throughout this specification that the interconnections among the various components are embodied with hoses, ducts, channels, conduits, pipes, or any other interconnecting member for conveying an air flow therein, as known in the art. Thus, the term "duct" is used generally in this specification to refer to any such type of air flow communicating member as appropriate for the particular situation.

The operation of the ventilation and air-conditioning system according to the invention in the example embodiment of FIG. 1 will now be discussed. For ventilating and air-conditioning the upper deck space 2, temperature regulated mixed air is blown into the upper cabin through the air inlet or inlets 93. The recirculation proportion of this mixed airstream for the upper cabin is directly removed from the upper cabin through the used air outlet 60, in that the blower unit 62 of the first recycling unit 6 sucks the appropriate flow quantity of used air out of the upper cabin, cleans and processes it through the filter unit 61 and delivers it to the first mixing junction 9 where it is mixed with the proper proportion of fresh air, to be finally returned to the upper cabin as mixed air through the inlet or inlets 93.

Since an amount of fresh air is being added or introduced to the upper cabin, it is necessary to remove a corresponding amount of used air from the upper cabin in order to avoid a pressure increase or pressure decrease in the upper deck space 2. In order to achieve this, a second portion of used air is removed from the upper deck space 2 through the air outlet 70 using at least a rotational speed controlled blower unit 72 of the recycling unit 7 to remove exactly the same quantity of used air through the outlet 70 as the quantity of fresh air being added via the mixing junction 9 through the air inlet 93. As a result, by means of controlled or regulated suction-removal of the appropriate amount of used air, an equalized or compensated volume flow balance is achieved in the upper deck space 2, wherein the amount of air being added to the upper deck space equals the amount of air being removed from the upper deck space (and not recirculated thereto), which is preferably a constant value for a particular operating condition.

The second portion of used air that is removed from the upper deck space 2 is cleaned and processed through the filter unit 71 of the second recycling unit 7 and is then provided as a deck transfer recirculation air stream to the second mixing junction 10, where it is mixed with fresh air to provide a temperature controlled mixed air stream. This mixed air stream flows from the second mixing junction 10 into and through the main deck space 3 from the air supply inlet 103. The finally used air leaves the main deck space 3 through the exhaust air channels 81 and 82. From these channels 81 and 82, the used exhaust air is vented from the exhaust air space 8 overboard the aircraft through the valve or valves 83. In this manner, an air flow balance or equilibrium is also achieved in the main deck space 3.

In the above described manner using the system according to the invention, an air exchange or air flow through the channel-like or passage-like interconnection 5, for example formed by a stairwell or stairway 5A, is avoided, and simultaneously a uniform air flow through all ventilated passenger cabin cross-sections is achieved without undesirable lengthwise air flows along the length of the cabins. As a result, it is possible to achieve a uniform cabin cross-sectional air flow through each respective cross-sectional zone along the length of the cabin by appropriately arranging and adjusting the plurality of air inlets and air outlets in the respective cabin cross-sections along the length of the respective cabins. In this context, of course, the used air portion removed from the upper deck space 2 is provided as recirculation air for the main deck space 3 as already described.

The above described embodiment of the invention demonstrates that the pressure increase resulting in the main deck space 3 as a result of the air flowing through the respective cabin cross-sections, is uniformly distributed or equilibrated over the entire passenger cabin space including the upper and main deck spaces 2 and 3, and is also equilibrated across the channel-like or passage-like interconnection opening 5, which may, for example be a stairway or simply even gaps and openings in the respective cabin paneling. As a result, uniform compensated interior pressures throughout the pressurized cabin spaces are guaranteed. Independently of the magnitude of the added fresh air proportion or the mixed air quantities that are blown into each cabin, both cabin spaces have the same cabin interior pressure, i.e. the interior pressures of the two pressurized cabins are always equilibrated to each other.

Figure 2:
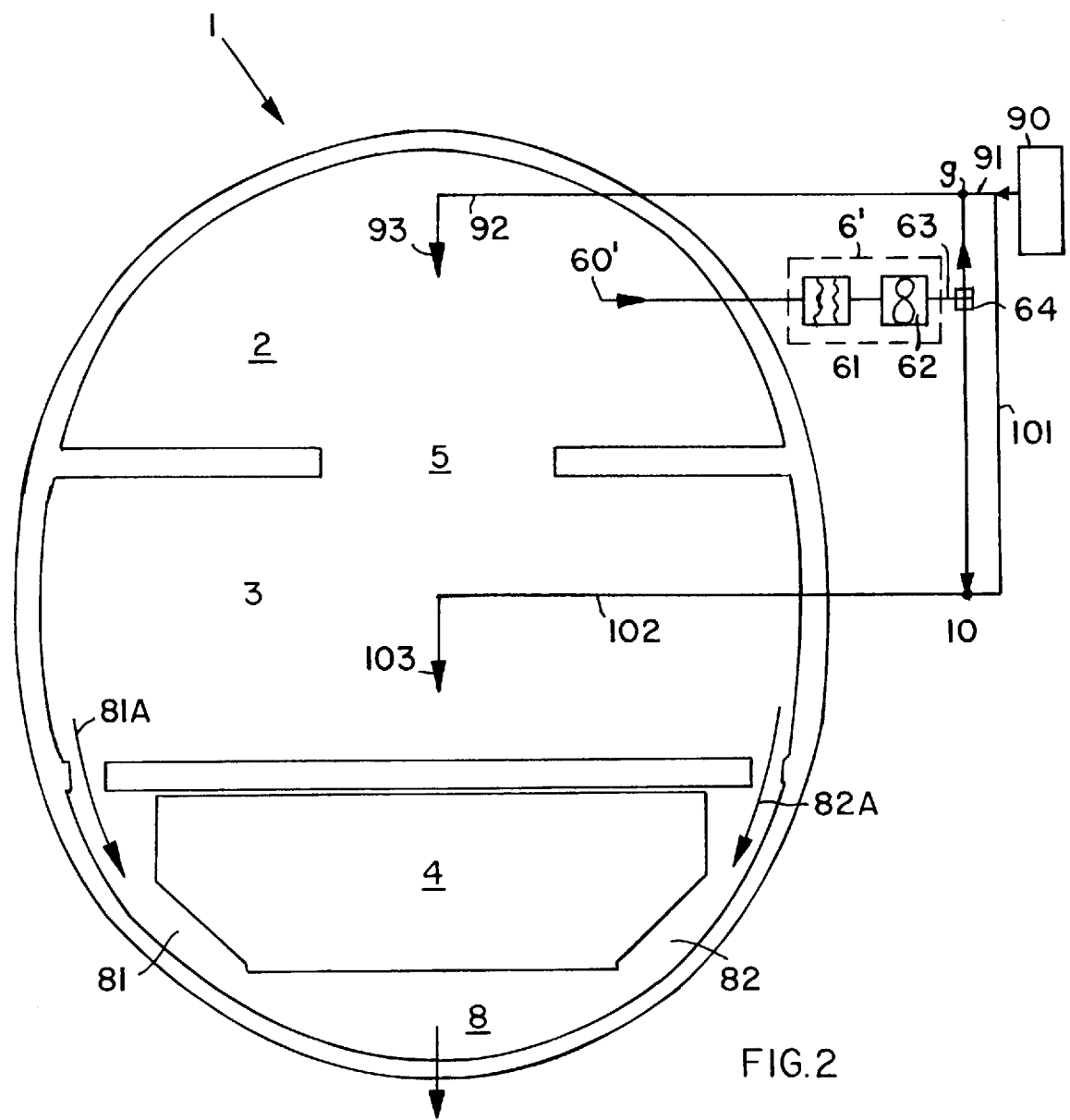
FIG. 2 is a view similar to that of FIG. 1, but showing a ventilation and air-conditioning system according to a variant of the invention.

FIG. 2 shows a variant of the embodiment described above. FIG. 2 simply schematically indicates that it is possible to incorporate both recycling units 6 and 7 into a single recycling unit 6' if desired. In such an embodiment, only a single set of used air outlets 60' would be needed (but ceiling and floor outlets could still be used if desired) to connect the single recycling unit 6' to the upper deck space 2. The outlet of the single recycling unit 6' is connected through a controllable proportioning valve 64 to both the first mixing junction 9 and the second mixing junction 10. Thus, all of the used air from the upper deck space 2 is sucked out of the upper deck space 2 and is processed or recycled through the single recycling unit 60'. Then, the proper proportion of the recycled air is directed to the first mixing junction 9 to be mixed with fresh air and returned as mixed air to the upper deck space 2, while a second proper proportion of the recycled air is directed to the second mixing junction 10 where it is mixed with fresh air and finally blown into the main deck space 3. This embodiment otherwise functions the same as the above described first embodiment. In either embodiment, the air flow rates and proportions are controlled in any manner known in the art for achieving such a result. For example, in the embodiment of FIG. 1, at least the blower unit 72, and preferably also the blower unit 62 has a controllable rotational speed so as to provide a controlled or metered air flow rate. Alternatively or additionally, it is possible to arrange air flow sensors and air flow regulating valves or dampers at the inlet or the outlet of each recycling unit, and/or in the fresh air lines 91 and 101 and the mixed air lines 92 and 102, as shown by dashed lines 65. In this manner, the fresh air addition rate, the recirculation rate or proportion, and the total air supply rate can be controlled as needed, substantially independently for each deck space 2 and 3.

As a further variant, under some air flow conditions, e.g. the respective required proportions or rates of fresh air and recirculation air to be introduced into each respective cabin, it may be desired to provide additional air flow connections as follows. It is further possible in the system of the invention to provide a used air bypass from the upper deck space 2 to the exhaust air space 8, which is advantageous in situations where a high proportion of fresh air is to be introduced into each cabin and therefore the used air removed from the upper cabin through the outlet 70 or at least a portion of such used air is not to be recirculated to the main deck space 3, but rather is to be directly exhausted overboard. It is also possible to provide a secondary recirculation duct leading from used air outlets arranged in the main deck space 3 to the inlet of the second recycling unit 7, which can be advantageous if a very low proportion of fresh air is to be added to the upper deck space 2, whereby the amount of deck transfer air removed from the upper deck space 2 and provided through the second recycling unit 7 is inadequate to satisfy the demand for recirculation air for the lower deck space 3.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A ventilation and air-conditioning system for a high capacity passenger aircraft having a fuselage, a first deck with a first passenger cabin therein within the fuselage, a second deck with a second passenger cabin therein and being arranged below the first deck within the fuselage, an airspace arranged below the second deck within the fuselage, and an interconnection opening between the first passenger cabin and the second passenger cabin; said ventilation and air-conditioning system comprising:

an exhaust valve arranged in the fuselage and selectively communicating the airspace to an external environment outside of the fuselage, an exhaust air channel communicating the second passenger cabin to the airspace, a first air mixing junction having a first recirculated air inlet, a first fresh air inlet, and a first mixed air outlet that is connected for air flow to the first passenger cabin, a second air mixing junction having a second recirculated air inlet, a second fresh air inlet, and a second mixed air outlet that is connected for air flow to the second passenger cabin, a first air recycling unit respectively including at least one first blower unit, at least one first used air inlet connected with the first passenger cabin for air flow therefrom, and at least one first recirculated air outlet connected to said first recirculated air inlet of said first air mixing junction for air flow thereto, and a second air recycling unit respectively including at least one second blower unit, at least one second used air inlet connected with the first passenger cabin for air flow therefrom, and at least one second recirculated air outlet connected to said second recirculated air inlet of said second air mixing junction for air flow thereto, wherein said second blower unit of said second air recycling unit is adapted to be so controlled that a deck transfer air flow rate of used air being removed from the first passenger cabin through said at least one second used air inlet of said second air recycling unit is equal to a first fresh air supply rate of fresh air entering said first fresh air inlet of said first mixing junction.

2. The system according to claim 1, wherein the first deck is an upper deck, the first passenger cabin is an upper passenger cabin, the second deck is a main deck, the second passenger cabin is a main passenger cabin, the aircraft further includes a lower deck with a cargo and baggage hold therein and being arranged below the main deck, and the airspace is arranged below the lower deck, and wherein said system comprises two of said exhaust air channels arranged respectively at sides of the cargo and baggage hold between the fuselage and side walls of the cargo and baggage hold.

3. The system according to claim 2, wherein the upper passenger cabin, the main passenger cabin and the airspace together form a single common pressurized cabin space, and wherein the upper passenger cabin and the main passenger cabin together form a common air-conditioned cabin space.

4. The system according to claim 1, further comprising at least one source of pressurized, temperature-controlled fresh air connected to said first fresh air inlet of said first mixing junction and said second fresh air inlet of said second mixing junction.

5. The system according to claim 1, further comprising respective air ducts forming said connections from said first and second mixed air outlets to the first passenger cabin, from the first passenger cabin to said first and second used air inlets, and from said first and second recirculated air outlets to said first and second recirculated air inlets.

6. The system according to claim 1, wherein said second blower unit is further adapted to be so controlled that an outgoing air flow rate of used air being removed from the first passenger cabin through said at least one second used air inlet of said second air recycling unit is a part of an incoming air flow rate of mixed air being introduced into the first passenger cabin from said first mixed air outlet.

7. The system according to claim 1, wherein said first blower unit is adapted to be so controlled that it sucks a first controlled portion of used air out of the first cabin, and said second blower unit is adapted to be so controlled that it sucks a second controlled portion of used air out of the first cabin, such that said first controlled portion and said second controlled portion together equal an incoming air flow quantity introduced into the first cabin from said first mixed air outlet.

8. The system according to claim 7, wherein said first blower unit comprises a first rotational-speed controllable blower or fan, and said second blower unit comprises a second rotational-speed controllable blower or fan.

9. The system according to claim 7, further comprising at least one of flow rate sensors, flow rate controlling valves, and flow rate controlling dampers arranged in at least two locations selected from downstream of said first mixed air outlet, upstream of said first fresh air inlet, and upstream of said first recirculated air inlet in series with said first air recycling unit, and in at least two locations selected from downstream of said second mixed air outlet, upstream of said second fresh air inlet, and upstream of said second recirculated air inlet in series with said second air recycling unit.

10. The system according to claim 1, wherein each said air recycling unit respectively further comprises a filter unit including at least one of a particle filter, an odor filter and a bacteria filter arranged in series with and upstream of said respective blower unit between said respective used air inlet and said respective recirculated air outlet, and wherein each said blower unit respectively comprises a respective rotational-speed controllable blower or fan.

11. The system according to claim 10, wherein each said filter unit includes a series arrangement of said particle filter, said odor filter and said bacteria filter.

12. The system according to claim 1, wherein at least one of said first and second blower units comprises a speed controllable blower or fan, at least one of said first and second air recycling units respectively further comprises at least one filter for removing particles, odors and bacteria from recirculated air flowing therethrough, and said at least one filter is respectively arranged in series with and upstream of said respective blower unit between said respective used air inlet and said respective recirculated air outlet.

13. The system according to claim 1, further comprising an exhaust air outlet arranged proximate a cabin floor of the second passenger cabin and communicating the second passenger cabin with said exhaust air channel.

14. The system according to claim 1, further comprising a first cabin used air ceiling outlet arranged proximate a ceiling of the first passenger cabin and connected to said first used air inlet of said first air recycling unit, a first cabin used air floor outlet arranged proximate a floor of the first passenger cabin and connected to said second used air inlet of said second air recycling unit, a first cabin mixed air ceiling inlet arranged proximate the ceiling of the first passenger cabin and connected to said first mixed air outlet of said first mixing junction, and a second cabin mixed air ceiling inlet arranged proximate a ceiling of the second passenger cabin and connected to said second mixed air outlet of said second mixing junction.

15. The system according to claim 1, wherein said interconnection opening is a passageway opening through and interconnecting a ceiling of the second passenger cabin and a floor of the first passenger cabin, and wherein the aircraft further includes a stairway that passes through the passageway opening and interconnects the first passenger cabin and the second passenger cabin.

16. The system according to claim 1, further in combination with and further comprising said high capacity passenger aircraft.

17. A method of ventilating and air-conditioning a high capacity passenger aircraft having an upper passenger cabin and a lower passenger cabin below said upper passenger cabin, with a passageway opening interconnecting said upper and lower passenger cabins, comprising the following steps:

removing a first portion of used air from said upper passenger cabin at a first used air flow rate, processing said first portion of used air to prepare a first recirculation air flow that is suitable for recirculation into said upper passenger cabin, mixing said first recirculation air flow with a first flow of air-conditioned fresh air provided at a first fresh air flow rate to prepare a first mixed air flow, introducing said first mixed air flow into said upper cabin, removing a second portion of used air from said upper passenger cabin at a second used air flow rate, processing said second portion of used air to prepare a second recirculation air flow that is suitable for recirculation into said lower passenger cabin, mixing said second recirculation air flow with a second flow of air-conditioned fresh air to prepare a second mixed air flow, introducing said second mixed air flow into said lower passenger cabin, and removing lower cabin used air from said lower passenger cabin and exhausting said lower cabin used air overboard from said aircraft, wherein said method is carried out to avoid a pressure imbalance and a resulting air flow through said passageway opening between said upper and lower passenger cabins.

18. The method according to claim 17, wherein said step of removing a second portion of used air is carried out so that said second used air flow rate is equal to said first fresh air flow rate.

19. The method according to claim 17, wherein the lower passenger cabin is a main passenger cabin in the aircraft.

20. A ventilation and air-conditioning system for a high capacity passenger aircraft having a fuselage, a first deck with a first passenger cabin therein within the fuselage, a second deck with a second passenger cabin therein and being arranged below the first deck within the fuselage, an airspace arranged below the second deck within the fuselage, and an interconnection opening between the first passenger cabin and the second passenger cabin; said ventilation and air-conditioning system comprising:

an exhaust valve arranged in the fuselage and selectively communicating the airspace to an external environment outside of the fuselage, an exhaust air channel communicating the second passenger cabin to the airspace, a first air mixing junction having a first recirculated air inlet, a first fresh air inlet, and a first mixed air outlet that is connected for air flow to the first passenger cabin, a second air mixing junction having a second recirculated air inlet, a second fresh air inlet, and a second mixed air outlet that is connected for air flow to the second passenger cabin, and one air recycling unit including at least one blower unit, at least one used air inlet connected with the first passenger cabin for air flow therefrom, and at least one recirculated air outlet connected to said first recirculated air inlet of said first air mixing junction for air flow thereto and connected to said second recirculated air inlet of said second air mixing junction for air flow thereto.

21. The system according to claim 20, wherein said at least one recirculated air outlet comprises a proportioning valve arrangement with a first outlet connected to said first recirculated air inlet and a second outlet connected to said second recirculated air inlet.

22. The system according to claim 20, wherein said at least one blower unit is adapted to be so controlled that an outgoing air flow rate of used air being removed from the first cabin through said at least one used air inlet of said air recycling unit is equal to an incoming air flow rate of mixed air being introduced into the first cabin from said first mixed air outlet.

* * * * *